United States Patent
Almog et al.

(10) Patent No.: US 8,982,703 B2
(45) Date of Patent: Mar. 17, 2015

(54) ROUTING SUPPORT FOR LOSSLESS DATA TRAFFIC

(71) Applicant: Mellanox Technologies Ltd., Yokneam (IL)

(72) Inventors: Ariel Almog, Kochav Yair (IL); Yaniv Saar, Hod Hasharon (IL); Aviad Raveh, Bat Hefer (IL); Dror Goldenberg, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 80 days.

(21) Appl. No.: 13/717,733

(22) Filed: Dec. 18, 2012

(65) Prior Publication Data

US 2014/0169169 A1    Jun. 19, 2014

(51) Int. Cl.
*G01R 31/08*    (2006.01)
*H04L 12/851*    (2013.01)
*H04L 12/725*    (2013.01)
*H04L 12/823*    (2013.01)

(52) U.S. Cl.
CPC .......... *H04L 47/2441* (2013.01); *H04L 45/306* (2013.01); *H04L 47/32* (2013.01)
USPC ....................................... 370/235

(58) Field of Classification Search
USPC ......... 370/230, 235, 229, 412, 232, 363, 378, 370/428, 468
See application file for complete search history.

(56) References Cited

U.S. PATENT DOCUMENTS

| | | | |
|---|---|---|---|
| 5,999,536 A | 12/1999 | Kawafuji et al. | |
| 6,169,741 B1 | 1/2001 | Lemaire et al. | |
| 6,831,918 B1 | 12/2004 | Kavak | |
| 7,009,968 B2 | 3/2006 | Ambe et al. | |
| 7,499,456 B2 | 3/2009 | De Silva et al. | |
| 7,650,424 B2 | 1/2010 | Armitage | |
| 7,715,328 B2 | 5/2010 | Ambe et al. | |
| 8,175,094 B2 | 5/2012 | Bauchot et al. | |
| 8,243,745 B2 | 8/2012 | Endo et al. | |
| 2002/0039357 A1 | 4/2002 | Lipasti et al. | |
| 2011/0261687 A1* | 10/2011 | Armstrong et al. | 370/230 |
| 2012/0051362 A1 | 3/2012 | Rabie et al. | |
| 2012/0063466 A1 | 3/2012 | Sultan et al. | |
| 2012/0275301 A1* | 11/2012 | Xiong | 370/230 |
| 2013/0182704 A1* | 7/2013 | Jacobs et al. | 370/357 |

OTHER PUBLICATIONS

Annex 31B of IEEE802.3x, "MAC Control Pause operation", pp. 741-751, year 2008.
Ayoub et al., U.S. Appl. No. 13/731,030, filed Dec. 30, 2012.
(Continued)

*Primary Examiner* — Phuongchau Ba Nguyen
(74) *Attorney, Agent, or Firm* — D. Kligler I.P. Services Ltd.

(57) ABSTRACT

A method for communication in a packet data network including at least first and second subnets interconnected by routers. The method includes defining at least first and second classes of link-layer traffic within the subnets, such that the link-layer traffic in the first class is transmitted among nodes in the network without loss of packets, while at least some of the packets in the second class are dropped in case of network congestion. The routers are configured by transmitting control traffic over the network in the packets of the second class. Data traffic is transmitted between the nodes in the first and second subnets via the configured routers in the packets of the first class.

8 Claims, 2 Drawing Sheets

(56) References Cited

OTHER PUBLICATIONS

Nichols et al., "Definition of the differentiated Services Field (DS Field) in the IPv4 and IPv6 Headers", Network Working Group, Internet Engineering Task Force, RFC2474, 19 pages, Dec. 1998.
IEEE 802.1Q, "Media Access Control (MAC) Bridges and Virtual Bridged Local Area Networks", IEEE Standard for Local and metropolitan area networks, chapter 6 (p. 47-96) and chapter 9.6 (pp. 150-151), Aug. 31, 2011.
IEEE 802.1Qbb, "Media Access Control (MAC) Bridges and Virtual Bridged Local Area Networks—Amendment 17: Priority-based Flow Control", IEEE Standard for Local and metropolitan area networks, 40 pages, Sep. 30, 2011.
Cisco Systems, "Priority Flow Control: Build Reliable Layer 2 Infrastructure", 8 pages, Jun. 2009.
Infiniband Trade Association, "Architecture Specification", vol. 1, Release 1.2.1., Nov. 2007.
Vershkov et al., U.S. Appl. No. 13/721,052, filed Dec. 20, 2012.
Almog et al., U.S. Appl. No. 13/754,912, filed Jan. 31, 2013.
U.S. Appl. No. 13/754,912 Office Action dated Oct. 23, 2014.

* cited by examiner

ROUTING SUPPORT FOR LOSSLESS DATA TRAFFIC

FIELD OF THE INVENTION

The present invention relates generally to computer networks, and particularly to methods and apparatus for routing of data packets in a network.

BACKGROUND

Ethernet™ is a link-layer (Layer 2) protocol defined by IEEE standard 802.3. Ethernet networks have conventionally been regarded as an unreliable communication medium, giving no guarantee that a packet injected into the network will arrive at its intended destination. Transmitters in traditional Ethernet networks may send packets faster than receivers are able to accept them, and when a receiver runs out of available buffer space, it silently drops the packets that exceed its capacity. Reliability, when required, was provided by upper-layer protocols, such as the Transmission Control Protocol (TCP). By contrast, other types of networks, such as Infini-Band™ networks, were designed to incorporate flow control at the link level, which enables a receiving node to convey feedback to a corresponding transmitting node in order to communicate buffer availability, and thus support reliable link-layer transmission.

More recently, mechanisms of priority flow control (PFC) have been developed to provide reliable link-layer transmission in Ethernet networks. Such mechanisms are described, for example, in a white paper entitled, "Priority Flow Control: Build Reliable Layer 2 Infrastructure" (Cisco Systems, Inc., San Jose, Calif., 2009). They are based on IEEE 802.3x PAUSE control frames, as defined in Annex 31B of the IEEE 802.3 specification. A receiver can send a medium access control (MAC) frame with a PAUSE request to a sender when it predicts the potential for buffer overflow, and the sender will respond by stopping transmission of any new packets until the receiver is ready to accept them again.

The IEEE 802.1Qbb standard for Priority-based Flow Control extends the basic IEEE 802.3x PAUSE semantics to multiple classes of service, with the possibility of independent flow control for each class. For this purpose, PFC uses class of service (CoS) values provided by the IEEE 802.1p standard, which are inserted in the virtual local area network (VLAN) tag of Ethernet frames (as defined by the IEEE 802.1Q standard). The three-bit priority code point (PCP) field of the VLAN tag can be used to specify eight different classes of service for such purposes, which the 802.1Q standard recommends be defined as follows, in order from lowest priority (0) to highest (7):

TABLE I

ETHERNET CLASSES OF SERVICE

| PCP | Priority | Acronym | Traffic Types |
|---|---|---|---|
| 1 | 0 | BK | Background |
| 0 | 1 | BE | Best Effort |
| 2 | 2 | EE | Excellent Effort |
| 3 | 3 | CA | Critical Applications |
| 4 | 4 | VI | Video, <100 ms latency and jitter |
| 5 | 5 | VO | Voice, <10 ms latency and jitter |
| 6 | 6 | IC | Internetwork Control |
| 7 | 7 | NC | Network Control |

Ethernet Layer-2 networks are commonly integrated as subnets of Layer-3 Internet Protocol (IP) networks. A subnet (short for subnetwork) is a logical subdivision of a Layer-3 network. Network ports of nodes within a given subnet share the same Layer-3 network address prefix. For example, in IP networks, the ports in each subnet share the same most-significant bit-group in their IP address. Typically, the logical subdivision of a Layer-3 network into subnets reflects the underlying physical division of the network into Layer-2 local area networks. The subnets are connected to one another by routers, which forward packets on the basis of their Layer-3 (IP) destination addresses, while within a given subnet packets are forwarded among ports by Layer-2 switches or bridges. These Layer-2 devices operate in accordance with the applicable Layer-2 protocol and forward packets within the subnet according to the Layer-2 destination address, such as the Ethernet MAC address.

Routing protocols are used to distribute routing information among routers, so as to enable each router to determine the port through which it should forward a packet having any given Layer-3 destination address. In IP networks, the routing information is generally developed and distributed by and among the routers themselves. A number of routing protocols are commonly used to exchange routing information among IP routers, such as Open Shortest Path First (OSPF) and the Border Gateway Protocol (BGP).

Remote direct memory access (RDMA) protocols enable direct memory access over a network from the memory of one computer to another without directly involving the computer operating systems. In InfiniBand networks, RDMA read and write operations are an integral part of the transport-layer protocol. These operations provide high-throughput, low-latency data transfers, which are carried out by the network interface controller (generally referred to in InfiniBand parlance as a host channel adapter, or HCA) under application-level control. RDMA over Converged Ethernet (RoCE) provides similar capabilities over an Ethernet network, but as such supports communication only between hosts in the same Ethernet (Layer 2) broadcast domain, i.e., with a range no greater than a single IP subnet. The Internet Wide Area RDMA Protocol (iWARP) overcomes this limitation by providing RDMA service over a connection-oriented transport protocol, typically TCP, but has not gained wide acceptance.

SUMMARY

Embodiments of the present invention provide methods and apparatus to support routing and forwarding of data packets in a network without packet loss.

There is therefore provided, in accordance with an embodiment of the present invention, a method for communication in a packet data network including at least first and second subnets interconnected by routers. The method includes defining at least first and second classes of link-layer traffic within the subnets, such that the link-layer traffic in the first class is transmitted among nodes in the network without loss of packets, while at least some of the packets in the second class are dropped in case of network congestion. The routers are configured by transmitting control traffic over the network in the packets of the second class. Data traffic is transmitted between the nodes in the first and second subnets via the configured routers in the packets of the first class.

The data traffic may include remote direct memory access (RDMA) packets.

In some embodiments, defining the at least first and second classes includes defining first and second priority flow control classes, and configuring the nodes of the network to apply congestion flow control to the first class but not to the second class. Transmitting the control traffic and the data traffic may include placing the packets in the first and second classes into respective first and second queues for transmission by the nodes, wherein the second queues have a higher priority for transmission than the first queues. Additionally or alternatively, transmitting the control traffic and the data traffic includes identifying the first and second priority flow control classes includes writing respective first and second values to a priority field in a header of the packets.

In a disclosed embodiment, transmitting the control traffic includes distributing Internet Protocol (IP) routing information to the routers while avoiding deadlocks in distribution of the IP routing information over cyclical paths by dropping the at least some of the packets in the second class when network congestion occurs.

There is also provided, in accordance with an embodiment of the present invention, apparatus for communication, including a plurality of routers, which are operative to interconnect at least first and second subnets in a packet data network. The routers accept a definition of at least first and second classes of link-layer traffic within the subnets, such that the link-layer traffic in the first class is transmitted among nodes in the network without loss of packets, while at least some of the packets in the second class are dropped in case of network congestion. The routers are configured by transmitting control traffic over the network in the packets of the second class, while data traffic between the nodes in the first and second subnets is transmitted via the configured routers in the packets of the first class.

The present invention will be more fully understood from the following detailed description of the embodiments thereof, taken together with the drawings in which:

DETAILED DESCRIPTION OF EMBODIMENTS

Figure 1:
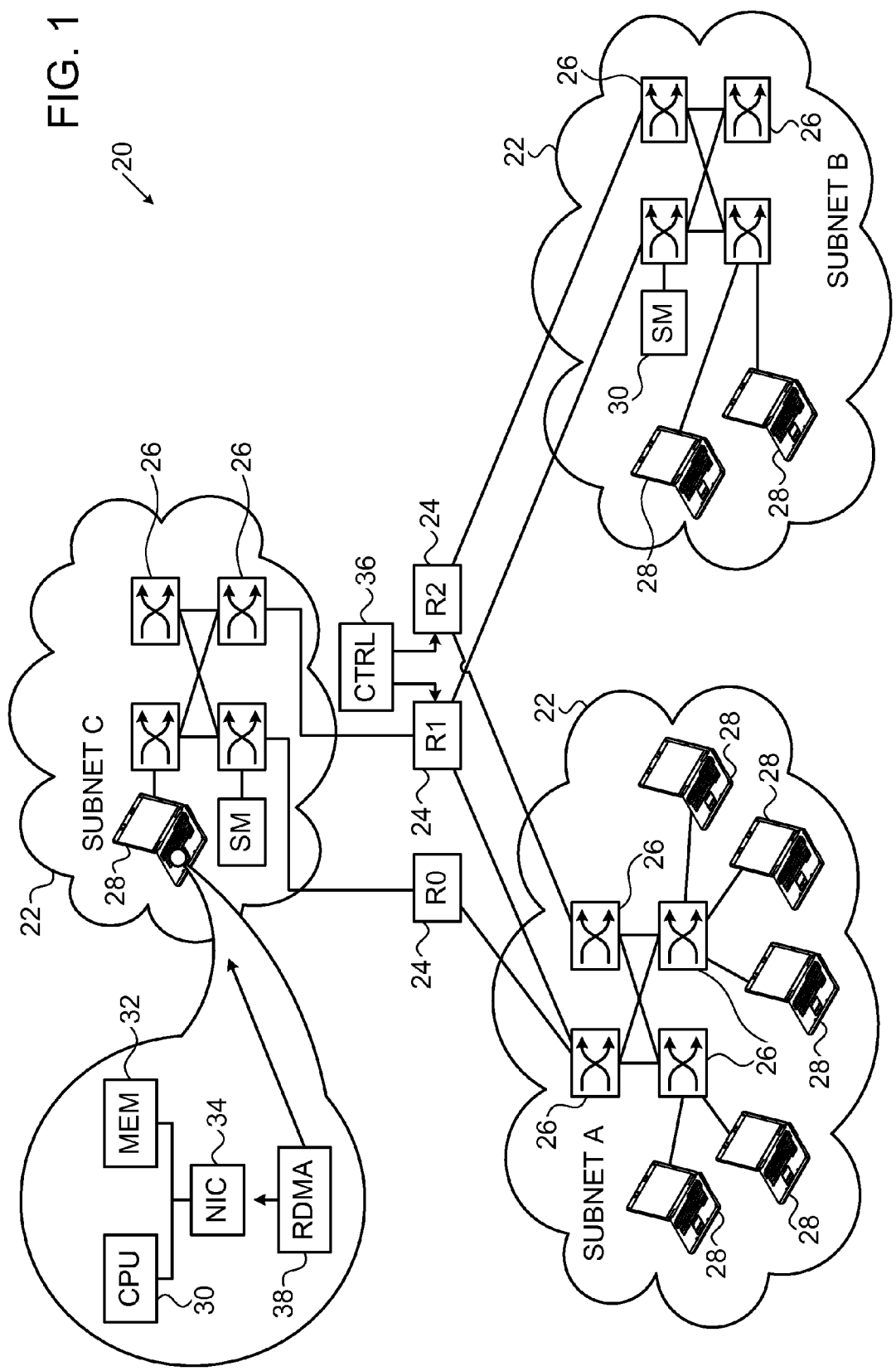
FIG. 1 is block diagram that schematically illustrates a computer network, in accordance with an embodiment of the present invention.

Layer-2 PFC can be used to advantage in supporting data transfer protocols, such as RDMA, that require reliable transmission over Ethernet networks. Extending reliable data transmission beyond a single IP subnet, however, generally requires the use of a reliable transport-layer (Layer 4) protocol, such as TCP. This requirement leads to complications and inefficiencies in implementation of RDMA-type protocols, such as iWARP, over IP networks.

Embodiments of the present invention that are described hereinbelow address this issue by providing a protocol infrastructure that can be used efficiently in routing reliable data traffic among multiple subnets in a Layer-3 network, such as an IP network. Such data traffic is conveyed in the network using a lossless traffic class, such as a selected Ethernet PFC class with flow control configured to provide lossless transmission. Routing control traffic, however, is conveyed specifically by a lossy traffic class, i.e., a class configured so that packets in the class are dropped in case of network congestion. In other words, although the control traffic serves the high-priority function of configuring the routers (which typically has higher priority in packet forwarding than does data traffic), transmission of the control packets is intentionally unreliable.

The inventors have found that the use of a lossy traffic class in transmission of control traffic, such as routing information, is advantageous in avoiding deadlocks in the distribution of routing information. If a reliable class is used for control traffic, and a cyclical network path exists among the routers, a situation may arise in which each node on this path has a full buffer and therefore instructs the preceding node to pause transmission. As a result, the nodes on the cyclical path are all unable to empty their buffers (since packets in a reliable class may not be dropped), and forwarding of control packets containing routing information is blocked. In this sort of situation, known as a credit loop, the routing protocol will stall and forwarding of data traffic will deteriorate or halt altogether. Such situations are avoided in embodiments of the present invention by assigning the control traffic to a lossy class, so that deadlocks can be resolved simply by dropping packets when buffers fill. The higher-level routing protocols that are used to generate and distribute the actual routing information will automatically retransmit packets anyway as necessary.

This approach—in which high-priority control traffic is transmitted in a lossy class, while lower-priority data traffic is transmitted in a lossless class—makes it possible to implement reliable data transfer protocols, such as RDMA, over IP networks, as well as Layer-3 networks of other types. In contrast to methods of RDMA over IP networks that are known in the art, which require a supporting transport-layer protocol (such as TCP), the present embodiments take advantage of the existing Layer-2 (Ethernet) and Layer-3 (IP) infrastructure to provide the required reliability at the link layer. Consequently, RDMA can be implemented over an Ethernet/IP infrastructure with efficiency (in terms of low latency and high throughput) approaching that of RDMA over Infini-Band.

FIG. 1 is a block diagram that schematically illustrates a computer network 20, in accordance with an embodiment of the present invention. In the description that follows, it will be assumed that network 20 is an IP network and operates in accordance with protocols of the IP suite, using the PFC mechanism described above for class differentiation and flow control. Alternatively, however, the principles of the present invention may be applied, mutatis mutandis, in other sorts of networks that have similar mechanisms for definition and support of differentiated, lossless and lossy traffic classes.

Network 20 comprises multiple subnets 22 (labeled subnets A, B and C in the figure), which are interconnected by IP routers 24 (labeled R0, R1 and R2). Each subnet 22 comprises multiple Layer-2 switches 26, such as Ethernet switches, which connect to host computers 28 (referred to hereinafter simply as hosts). Each host typically comprises a central processing unit (CPU) 30 with a system memory 32, connected by a bus to a network interface controller (NIC) 34, which links the host to the network. Elements of network 20 that transmit and receive packets, including routers 24, switches 26, and hosts 28, are collectively referred to herein as "nodes" of the network. The terms "Layer 2" and "link layer," as provided by the well-known Open Systems Interface (OSI) model, are used herein interchangeably to describe the operation of subnets 22, while the name "Ethernet" refers to a particular set of link-layer protocols that are implemented in these subnets in the example embodiments.

Switches 26 within each subnet 22 may be interconnected in any suitable topology, such as a "fat tree" topology. Certain of the switches (for example, spine switches in the case of a fat tree topology) connect to routers 24 and thus enable packet transfer between subnets. A suitable Layer-2 bridging protocol, such as the well-known Spanning Tree Protocol (STP), may be applied by the switches in each subnet to ensure that there are no loops within the subnet. Such protocols do not apply, however, to the Layer-3 topology and routers 24 of network 20.

To configure the routing tables that they will use to forward traffic among subnets 22, routers 24 exchange control packets 36 via network 20. These control packets are typically IP packets, with payloads containing control information in accordance with an applicable routing protocol, such as the above-mentioned BGP or OSPF. As can be seen in FIG. 1, paths among routers 24 in network 20 may contain loops. In order to avoid situations in which these loops lead to deadlocks in distribution of the routing information, control packets 36 transmitted through subnets 22 are identified in their Ethernet headers as belonging to a lossy traffic class. Nodes of network 20 may thus drop control packets 36 upon encountering congestion in the network.

Hosts 28 exchange data over network 20 by transmitting and receiving data packets, such as RDMA packets 38. In the RDMA model, when an application running on CPU 30 needs to transfer data to or from a peer application running on another host, the application submits a request to NIC 34 to initiate an RDMA operation. The NIC executes the request by transferring data directly to or from memory 32 over network 20 in RDMA packets 38. To ensure proper operation of the RDMA protocol, these packets are identified in their Ethernet headers as belonging to a lossless traffic class.

Figure 2:
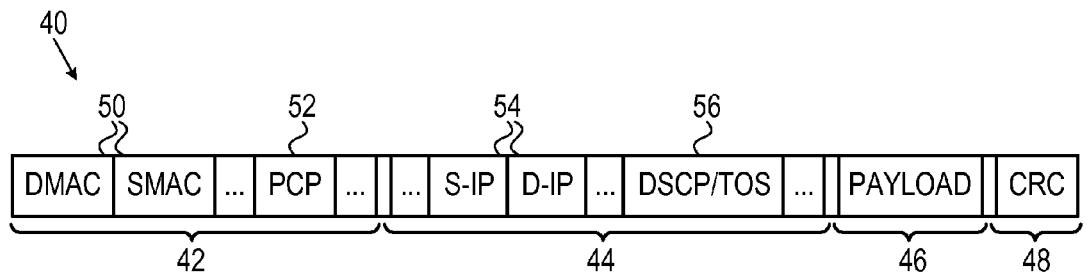
FIG. 2 is a block diagram that schematically illustrates a data packet, in accordance with an embodiment of the present invention.

FIG. 2 is a block diagram that schematically illustrates a data packet 40 with priority tags, in accordance with an embodiment of the present invention. These tags are used to identify the class of service to which each packet belongs. Switches 26 (and possibly routers 24) are programmed, in turn, to apply priority-based flow control to each class depending on whether or not packet loss is to be permitted in that class. Thus, referring to Table I above, for example, PCP classes 2 and 3 may be defined as lossless classes, subject to flow control in accordance with IEEE 802.1Qbb, while the remaining classes (including high-priority control classes 6 and 7) are defined as lossy classes. Alternatively, any other suitable mapping of priority tags to flow control classes may be used, as long as it provides the appropriate lossless delivery of data traffic and lossy delivery of control traffic. Although RDMA (and possibly other data services requiring reliable delivery) are mapped to lossless classes, other sorts of data transfer, such as real-time voice and video, may be mapped to lossy PCP classes.

As shown in FIG. 2, packet 40 comprises an Ethernet header 42, followed by an IP header 44, a payload 46, and an error-checking code 48, such as a cyclic redundancy code (CRC). Ethernet header 42 begins with the conventional destination and source MAC (DMAC and SMAC) address fields 50, followed by other fields including a VLAN tag, which contains a three-bit PCP field 52, as defined above. When sending an RDMA packet, NIC 34 may set the value of this field to 011, for example, so that switches 26 will forward the packet without loss. A router 24 transmitting a control packet, on the other hand, may set the value of field 52 to 110 for high-priority transmission without flow control. Additionally or alternatively, routers 24 and/or switches 26 may set the value of field 52 in packets that they forward based on the contents of payload 46, for example depending on the higher-layer header fields (such as an RDMA transport header or a routing protocol header) that may be contained in the payload of packet 40.

The packet priority may be mirrored in IP header 44. This header contains IP source and destination address fields 54, as well as various other fields including a service type field 56. This latter field may contain three bits specifying the type of service (TOS), as provided by the original DARPA Internet Protocol specification, published by the Internet Engineer Task Force (IETF) as Request for Comments (RFC) 791. Alternatively, field 56 may contain the six-bit differentiated services code point (DSCP), as defined by IETF RFC 2474, which includes a three-bit class selector corresponding to the TOS. In transferring packets between subnets 22, routers 24 typically replace Ethernet header 42; but in so doing, the routers may either pass through the value of PCP field 52 in the received packet to the new Ethernet header or may add the appropriate PCP value based on the value of field 56 in IP header 44.

Although certain specific fields are chosen in packet 40 as the basis for packet classification, and these fields are well suited for use in IP and Ethernet networks, other fields may alternatively be assigned and defined and used for this purpose, both in IP and Ethernet packets and in packets composed in accordance with other applicable network standards that are known in the art.

Figure 3:
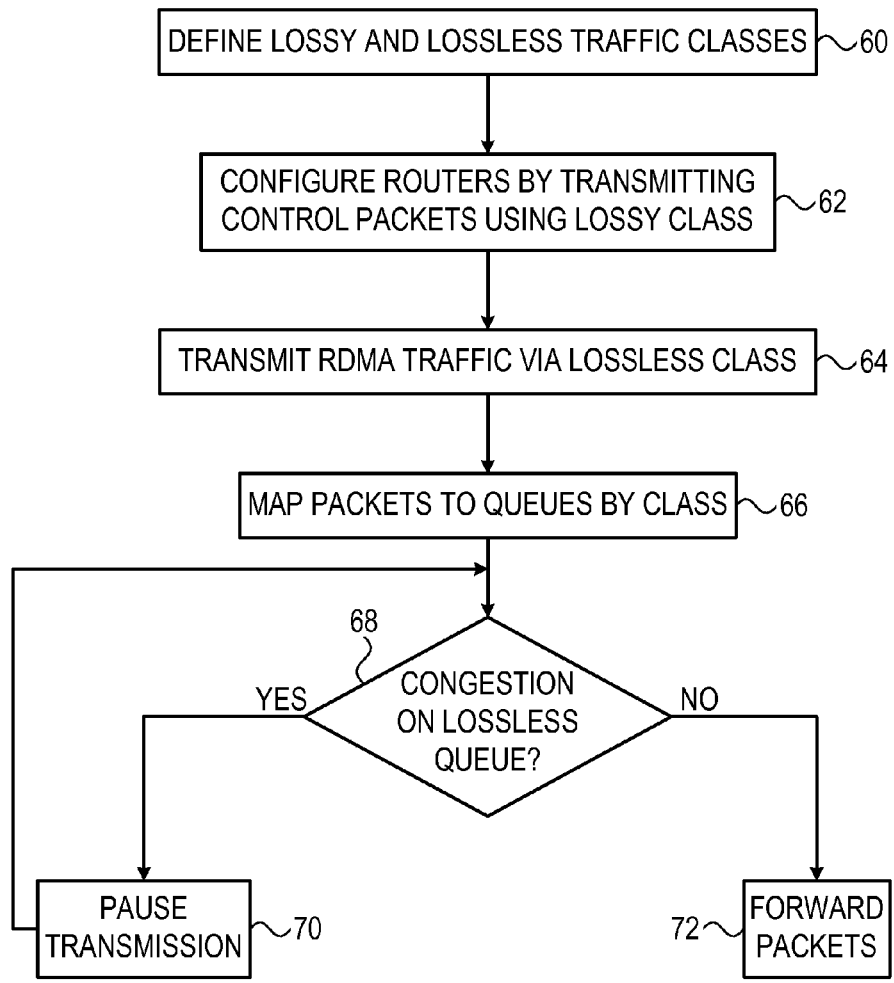
FIG. 3 is a flow chart that schematically illustrates a method for transmission of data packets, in accordance with an embodiment of the present invention.

FIG. 3 is a flow chart that schematically illustrates a method for transmission of data packets in network 20, in accordance with an embodiment of the present invention. As a precursor to this method, the network operator defines the traffic classes to be supported by the network, at a class definition step 60. Thus, for example, different types of traffic may be given different PCP values, and the PCP values may be assigned to different flow control classes, including lossless and lossy classes as appropriate. As noted earlier, some data protocols, such as RDMA, will be assigned to a lossless class, while high-priority control protocols, such as routing protocols, are assigned to a lossy class. The components of network 20, such as routers 24, switches 26, and possibly NICs 34, are configured to recognize the lossless and lossy classes and to forward traffic accordingly, with or without flow control as appropriate for each given class.

Routers 24 exchange control packets 36 and thus build their respective routing tables, at a configuration step 62. Alternatively or additionally, configuration information may be provided to the routers by other means, such as using methods of software-defined networking (SDN). In any case, the routing information is propagated and may subsequently be updated during network operation by transmitting packets over network 20 in an appropriate lossy traffic class. On the other hand, as noted earlier, hosts 28 transmit RDMA traffic using the appropriate lossless traffic class, at a data transmission step 64.

Upon receiving a packet for forwarding, switch 26 or router 24 queues the packet according to its class, at a queuing step 66. Either PCP field 52 in Ethernet header 42 or service type field 56 in IP header 44 may be used for this purpose. Packets in lossy queues are simply forwarded with the appropriate priority, or dropped if necessary when forwarding cannot be completed due to congestion or other problems. For packets in lossless queues, the forwarding switch or router checks, before forwarding the packet, whether congestion exists on the destination link, at a congestion checking step 68. Such congestion may be indicated, for example, by a PAUSE control received from the destination node. If congestion is encountered, the switch or router delays transmission until bandwidth is available, at a pause step 70. When bandwidth is available, the packet is transmitted onward, at a forwarding step 72.

Although network 20 and packet 40 conform to IP and Ethernet standards, the principles of the present invention may similarly be applied in Layer-3 networks of other types that are capable of supporting both lossless and lossy traffic classes. Lossless performance in congested conditions may be achieved in such networks not only by the pause-based methods that are provided by Ethernet standards, as described above, but also by other means, such as credit-based flow control mechanisms, as are known in the art.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
in a packet data network comprising at least first and second subnets interconnected by routers, defining at least first and second priority flow control classes of link-layer traffic within the subnets, and configuring nodes of the network to apply congestion flow control to the first class but not to the second class such that the link-layer traffic in the first class is transmitted among the nodes in the network without loss of packets, while at least some of the packets in the second class are dropped in case of network congestion;
configuring the routers by transmitting control traffic over the network in the packets of the second class; and
transmitting data traffic between the nodes in the first and second subnets via the configured routers in the packets of the first class,
wherein transmitting the control traffic and the data traffic comprises placing the packets in the first and second classes into respective first and second queues for transmission by the nodes, wherein the second queues have a higher priority for transmission than the first queues.

2. The method according to claim 1, wherein the data traffic comprises remote direct memory access (RDMA) packets.

3. The method according to claim 1, wherein transmitting the control traffic and the data traffic comprises identifying the first and second priority flow control classes comprises writing respective first and second values to a priority field in a header of the packets.

4. The method according to claim 1, wherein transmitting the control traffic comprises distributing Internet Protocol (IP) routing information to the routers while avoiding deadlocks in distribution of the IP routing information over cyclical paths by dropping the at least some of the packets in the second class when network congestion occurs.

5. Apparatus for communication, comprising a plurality of routers, which are operative to interconnect at least first and second subnets in a packet data network,
wherein the routers are operative to accept a definition of at least first and second priority flow control classes of link-layer traffic within the subnets, wherein nodes of the network to apply congestion flow control to the first class but not to the second class such that the link-layer traffic in the first class is transmitted among the nodes in the network without loss of packets, while at least some of the packets in the second class are dropped in case of network congestion, and
wherein the routers are configured by transmitting control traffic over the network in the packets of the second class, while data traffic between the nodes in the first and second subnets is transmitted via the configured routers in the packets of the first class, and
wherein the nodes are configured to place the packets in the first and second classes into respective first and second queues for transmission, wherein the second queues have a higher priority for transmission than the first queues.

6. The apparatus according to claim 5, wherein the data traffic comprises remote direct memory access (RDMA) packets.

7. The apparatus according to claim 5, wherein the first and second priority flow control classes are identified by respective first and second values in a priority field in a header of the packets.

8. The apparatus according to claim 5, wherein the nodes are configured to Internet Protocol (IP) routing information to the routers while avoiding deadlocks in distribution of the IP routing information over cyclical paths by dropping the at least some of the packets in the second class when network congestion occurs.

* * * * *